Feb. 13, 1940.  F. M. DALEY  2,190,376

NONABSORBENT CLOSED CELL POWDER PUFF

Filed Sept. 22, 1939

INVENTOR
FREDERICK M. DALEY.
BY
Ostrolenk + Greene
ATTORNEYS

Patented Feb. 13, 1940

2,190,376

UNITED STATES PATENT OFFICE 2,190,376

NONABSORBENT CLOSED CELL POWDER PUFF

Frederick M. Daley, Shelton, Conn., assignor to The Sponge Rubber Products Co., Derby, Conn., a corporation of Connecticut Application September 22, 1939, Serial No. 296,005

10 Claims. (Cl. 132—78.5)

My invention relates to a novel powder puff and more specifically to a powder puff comprising closed cell gas expanded rubber in which the surface of the powder puff presents a multiplicity of minute cut cells forming tiny vacuum cups.

Powder puffs are for the large part made of various fabrics usually of a fluffy material. A fabric is adapted to hold on its surface powder which is to be applied to the face and in such operations the powder puff also removes dirt and face oils. In the course of time the powder puffs become soiled and must be discarded or washed. Washing is a tedious process in that it is difficult to remove the conglomeration of dirt and oil from the fabric, and because the drying of this very absorbent material is a lengthy operation and more particularly because the washed powder puff is never as fluffy or satisfactory for use as the original, such puffs are for the most part discarded.

Powder puffs of sponge rubber have also been suggested but such sponge rubber puffs are deficient in that they absorb the powder and dirt in the interior of the mass since sponge rubber consists of a multiplicity of intercommunicating cells. That is, in sponge rubber there are a large number of small channels and cells throughout the rubber which renders the mass porous and as in the case of the common bath sponge, capable of picking up and retaining water. The washing of such sponge rubber puffs is a more difficult operation since the interior can not be thoroughly cleansed and since the drying process is also an extended operation.

I now provide a novel powder puff composed of closed cell gas expanded rubber. The process of manufacture of this closed cell rubber is set forth in the Denton Patent No. 1,905,269 and Patent No. 2,086,513. Under certain controls nitrogen gas is injected into a soft rubber and maintained therein in the form of closed cells. The gassed rubber is thus expanded and finally vulcanized by heat in such a manner that the gas cells in the rubber are sealed one from the other in the form of closed cells which are located homogeneously through the mass. The cells themselves are relatively minute but are visible to the naked eye.

Although Patent No. 1,905,269 and Patent No. 2,086,513 teach the process of production of closed cell gas expanded rubber by the external injection of gas it is also possible to manufacture closed cell gas expanded rubber by internally developed gas from chemicals mixed with rubber and this process is set forth in application Serial No. 159,706.

Primarily it is essential to form a soft and resilient gas expanded rubber that contains homogeneously throughout its mass relatively small closed cells.

This closed cell gas expanded rubber material is made in sheet form, the sheet having a smooth impervious skin to convert this sheet into stock for the manufacturing of the powder puff, this sheet is then cut or sliced along the plane of its length and width to provide two thin cut sheets of closed cell gas expanded rubber.

These cut sheets are then reversed and secured together with the smooth impervious original outer surface at the inside and with the cut surface forming the outside. The sheet so formed is then cut as by die cutting into the requisite shape for the desired powder puffs.

The powder puffs so formed present surfaces that are soft and flexible and contain a great number of minute hemispherical cups. These cups are formed by the slicing operation recited above. That is the cutting through of the closed cells forms cups from such spherical cells. These tiny cups play a vital part in the powder puff structure since they are particularly adapted not only to pick up oil and dirt from the surface of the skin by vacuum action but the cups also act as an excellent means for retaining the powder applied thereto for application to the face.

It is to be noted as an important feature of my invention that by this construction a minimum amount of powder is employed since no powder penetrates into the mass itself, the only powder picked up being taken into the tiny cups and onto the surface of the puff. This powder is released with facility upon the pressure and flexing contact of the puff with the face.

I wish to emphasize however, an important feature of the powder puff structure as discussed above. The sanitation of a powder puff is of great importance because of the danger of infection due to the fact that the skin can reabsorb oil and dirt. But a clean powder puff is desirable not only for medical reasons but also from the standpoint of aesthetics. Women prefer the appearance of a clean puff and puffs are ordinarily discarded primarily because they have become dirty.

The powder puff of my invention may be readily washed with facility and speed. After being sufficiently cleaned with soap and water drying is effected by placing the puff between two absorbent surfaces as the surfaces of a towel and then pressing it. The absorbent towel picks up all the moisture therein and in the space of a few seconds dries the powder puff completely in a clean condition, unlike the fabric powder puff which becomes rigid in washing both in regard to the softness of the texture and with regard to the physical surface condition.

Accordingly, it is the object of my invention to provide a novel powder puff of cut cell gas expanded rubber.

It is a further object of my invention to provide a powder puff the surface of which comprises a multiplicity of tiny hemispheric cups.

A further object of my invention provides a powder puff with a cut cell surface which is impervious to penetration beyond such cups.

It is a further object of my invention to form a nonabsorbent powder puff with a cleansing surface.

It is a further object of my invention to provide two sheets of gas expanded rubber adhesively joined.

Other objects of my invention will be apparent from a description of the drawing which follow:

In the drawing Figure 1 represents a perspective of my invention.

Figure 2:
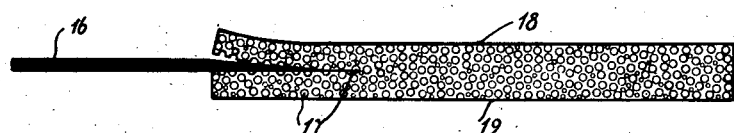
Figures 2 and 3 are edge views showing the manner of making the puff.

In Figure 2 I illustrate the manner in which I form the component parts of the structure of my powder puff.

Thus, I show in cross section sheet 15 of closed cell gas expanded rubber being cut by a sharp edge 16 such as a knife or razor. Sheet 15 is thus split into two layers a knife edge cutting through the closed gas cells and forming therefrom hemispherical cups. The sharp edge 16 cuts through cells 17 in various levels but in each case subdivides a closed cell in the plane of the cut into cups.

Figure 3:
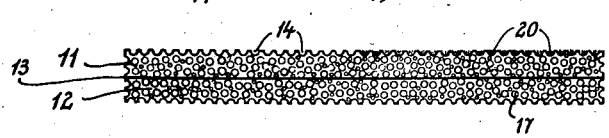

The two split layers of the sheet 15 are then reversed to place the cut surfaces outside and the smooth original external surfaces 18 and 19 are adhesively secured together as shown in Figure 3 by means of a rubber cement.

In Figure 3 the cut layers 11 and 12 are secured adhesively along the line 13, the cut layers having the surface cups 14 which are adapted to pick up and remove dirt and oil from the face and also to carry powder 20 for application to the face. Below these cups 14 which are formed in the splitting of the material are other closed cells 17 which afford resilience and softness to the powder puff. These cells 17 are located homogeneously through the material. It will be noted that the cups 14 do not communicate with the interior of the rubber mass 11 which accounts for the nonabsorbent quality of the powder puff.

Figure 4:
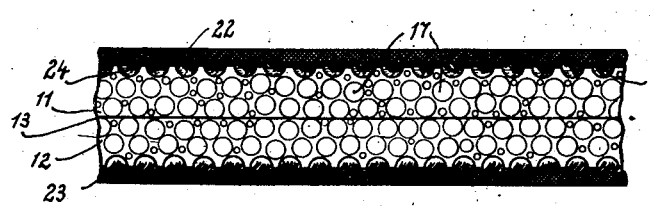
Figure 4 is an edge view disclosing the method of drying the puff after washing.

In Figure 4 I illustrate diagrammatically one of the features of the powder puff of my invention. Powder puffs of course, are quickly soiled and it is extremely desirable to maintain a powder puff in as clean a condition as possible. The difficulties of laundering ordinary powder puffs have been pointed out before. The powder puffs of my invention comprise rubber surfaces with small cups 14 located in these surfaces, such cups being non-communicating with each other or with the interior of the rubber mass. It is relatively a simple and quick operation with warm water and soap to wash the surface of the powder puff.

In order to dry, the powder puff is placed between absorbent surfaces 22 and 23 which may be a towel and upon pressure contact of such absorbent towel surfaces 22 and 23 with the surfaces of the powder puff, an extremely rapid drying operation is effected which involves only a few seconds. Inasmuch as the cups 14 are relatively shallow and carry a small amount of water 24, the absorbent surface of the towel quickly picks up the water. As I have pointed out hereinbefore the washed powder puff is of the same desirable soft texture and other properties as the original powder puff.

It is particularly important to note the distinction of the present powder puff from one formed from sponge rubber. In sponge rubber 15 the interstices which correspond with cups 14 are the end points of channels communicating with each other and extend in and through the rubber mass. Thus when such sponge rubber puffs are washed moisture is carried into the interior of the sponge mass, analogous indeed to the ordinary bath sponge, and the drying operation is not only extremely slow but there is always some residue or moisture left in the mass.

The structural differences between the present powder puff and such a sponge rubber powder puff are as markedly different as are the distinctions from the present closed cell gas expanded rubber powder puff and the fabric powder puff.

The surface structure of my powder puff also prevents the absorption of any quantity of the powder within the puff such as takes place in the fabric or sponge rubber puff. The only powder picked up is that which is picked up by the cups 14 and the external surfaces. This means not only economy with respect to the amount of powder used but also facility in rapid cleansing of the puff.

Figure 1:
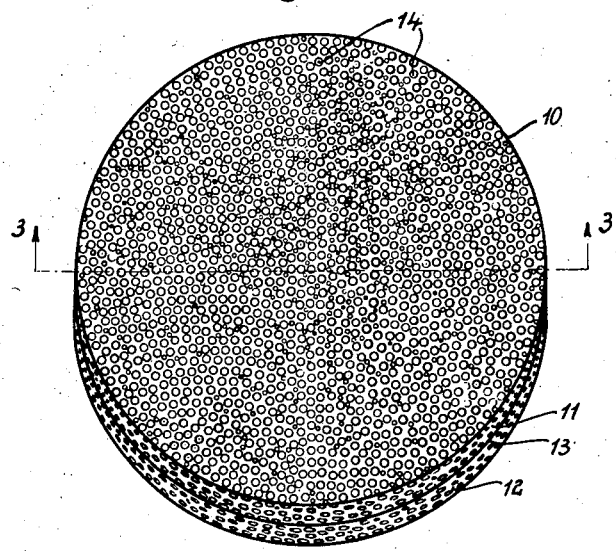

The process of manufacturing my powder puff comprises first the formation of a sheet of closed cell gas expanded rubber by methods described in the patent and application mentioned hereinbefore and secondly, splitting along the plane of the sheet and substantially the middle thereof to obtain two split sheets. The outer surface of these sheets are ordinarily smooth and the split or cut surfaces of the sheet acquire the structure of the cups as shown in Figures 1, 2 and 3 of the drawing. The two split sheets are secured together with the cut or split surface outward and then by die-cutting or otherwise, the powder puffs of proper size and shape are cut from the sheet.

Although I have shown my powder puff as comprising two layers it is to be understood that it may be made in the form of a single layer. The particular feature of importance is that the powder puff surface which is to be used is a cut surface of the closed cell rubber so that the tiny cups above described are formed therein. I have generally described the features of my invention and given a specific example of one embodiment thereof. I intend, however, certain other modifications within the scope of my invention.

For example, I may use this powder puff as a cosmetic applicator generally, as for the application of rouge, the application and removal of cold cream, etc.

As I have indicated hereinbefore, in addition to forming my applicator of two sheets of split closed cell rubber adhesively joined by rubber cement to secure flexibility of the unit, which flexibility would be impaired by the ordinary relatively stiff adhesive, I may cut a sheet of closed cell rubber into multiple layers in order to obtain the desired cut surface.

In lieu of using an applicator with both surfaces of the cut surface cup type, I may use simply one cut surface with the back of the puff comprising a solid, ordinary skin.

It is of further importance in the cosmetic applicator of my invention that when the applicator becomes worn by friction contact with the cake of powder and the surface of the applicator wears away into the next lower succeeding layer, then the cup will be formed by the wearing away of a portion of the closed cells 17 as shown in the drawing. Thus even though the powder puff is subjected to wear over a long period of time, a new surface is always available.

As the material for the manufacture of the closed cell structure I may employ either natural or synthetic rubber or any suitable rubber-like material that has physical properties corresponding thereto.

It is understood that the foregoing is by way of example only and I intend to be limited only by the appended claims.

I claim:

1. A sanitary powder puff comprising closed cell gas expanded soft rubber.

2. A sanitary powder puff comprising a sheet of closed cell gas expanded soft rubber.

3. A sanitary powder puff comprising a sheet of closed cell gas expanded soft rubber, the surface of said powder puff containing sections of said closed cells in the form of cups.

4. A sanitary powder puff comprising a multiplicity of sheets of closed cell gas expanded soft rubber.

5. A sanitary powder puff comprising a multiplicity of sheets of closed cell gas expanded soft rubber, the surface of said powder puff containing sections of said closed cells in the form of cups.

6. A sanitary powder puff comprising two sheets of closed cell gas expanded soft rubber secured to each other with the smooth side of said closed cell gas expanded rubber sheet facing in and the cut surface of said closed cell gas expanded rubber sheet facing out.

7. A sanitary powder puff comprising closed cell gas expanded soft rubber, the surface of said powder puff containing sections of said closed cells in the form of cups, said closed cell gas expanded soft rubber being nonabsorbent.

8. The method of making a powder puff which comprises splitting a sheet of closed cell gas expanded soft rubber along the plane of the sheet, reversing the split sheets and adhesively securing said split sheets together with the split surfaces facing outwardly.

9. The method of making a powder puff which comprises splitting a sheet of closed cell gas expanded soft rubber along the plane of the sheet, reversing the split sheets and adhesively securing said split sheets together with the split surfaces facing outwardly and cutting powder puffs from said laminated sheets.

10. A cosmetic applicator comprising closed cell gas expanded soft rubber.

FREDERICK M. DALEY.